United States Patent
Runyan et al.

(10) Patent No.: US 7,681,930 B2
(45) Date of Patent: Mar. 23, 2010

(54) DUCT FLANGE

(75) Inventors: Randy Runyan, Oxford, IA (US); John Joseph Toben, Cedar Rapids, IA (US)

(73) Assignee: FormTek, Inc., Westfield, MA (US)

( * ) Notice: Subject to any disclaimer, the term of this patent is extended or adjusted under 35 U.S.C. 154(b) by 0 days.

(21) Appl. No.: 11/937,222

(22) Filed: Nov. 8, 2007

(65) Prior Publication Data

US 2008/0111378 A1  May 15, 2008

Related U.S. Application Data

(60) Provisional application No. 60/865,229, filed on Nov. 10, 2006.

(51) Int. Cl.
*F16L 25/00* (2006.01)
(52) U.S. Cl. .......................... 285/424; 29/505
(58) Field of Classification Search ................. 285/424; 29/505
See application file for complete search history.

(56) References Cited

U.S. PATENT DOCUMENTS

| | | | | |
|---|---|---|---|---|
| 3,199,901 A * | 8/1965 | Jeppsson | .................... | 285/424 |
| 4,558,892 A * | 12/1985 | Daw et al. | ................... | 285/424 |
| 4,566,724 A * | 1/1986 | Arnoldt et al. | .............. | 285/424 |
| 4,725,083 A * | 2/1988 | Schauer | ....................... | 285/424 |
| 4,836,585 A * | 6/1989 | Schauer | ....................... | 285/424 |
| 4,865,365 A * | 9/1989 | Meinig | ........................ | 285/424 |
| 4,940,264 A * | 7/1990 | Mez | ............................ | 285/424 |
| 5,054,823 A * | 10/1991 | Arnoldt | ....................... | 285/424 |
| 5,358,013 A | 10/1994 | McClain | | |
| 5,450,879 A | 9/1995 | Toben | | |
| 6,109,665 A | 8/2000 | Meinig | | |
| 6,412,519 B1 * | 7/2002 | Goodhue | .................... | 285/424 |
| 6,547,287 B1 | 4/2003 | Shah et al. | | |
| 6,561,553 B1 * | 5/2003 | Issagholian-Havai | ....... | 285/424 |
| 7,234,734 B2 * | 6/2007 | Borwig et al. | .............. | 285/424 |
| 2004/0111988 A1 | 6/2004 | Toben | | |
| 2006/0170216 A1 | 8/2006 | Borwig et al. | | |
| 2008/0115550 A1 | 5/2008 | Walle | | |

FOREIGN PATENT DOCUMENTS

EP       1637814 A1    3/2006

* cited by examiner

*Primary Examiner*—David E Bochna
(74) *Attorney, Agent, or Firm*—McCormick, Paulding & Huber LLP

(57) ABSTRACT

A flange for ductwork is integrally formed at a distal end of a duct surface. A first flange portion is formed perpendicularly outward from the duct surface. A second flange portion is bent at a right angle from the first flange portion and substantially parallel to the duct surface. A third flange portion is bent back to be in substantial touching relationship with the second flange portion and towards the first flange portion. A fourth flange portion is bent at a right angle from the third flange portion to be in substantial touching relationship with the first flange portion. Finally, a fifth flange portion is bent at a right angle from the fourth flange portion to be in substantial touching relationship with the duct surface.

2 Claims, 3 Drawing Sheets ably, a sixth flange portion 230 is bent in an S-shape around the duct wall 214 and ends with the inner portion 212.
DUCT FLANGE

CROSS REFERENCE TO RELATED APPLICATIONS

This application claims the benefit of U.S. Provisional Application Ser. No. 60/865,229, filed on Nov. 10, 2006, herein incorporated by reference in its entirety.

FIELD OF THE INVENTION

This invention relates in general to a duct flange. This invention deals more particularly with a double wall TDX flange for ductwork, wherein the double wall TDX flange has increased strength and durability, and an IPI box flange, wherein the IPI box flange has increased strength over other box flanges.

BACKGROUND OF THE INVENTION

Rectangular or box-shaped ducts are extensively utilized in heating, air conditioning, and ventilating systems to distribute heated or cooled air throughout a structure. These ducts are commonly formed from differing gauges of sheet metal in sections of predetermined lengths, which are then connected to one another to form a continuous duct for distributing air.

These ducts are typically composed of relatively short sections. Transverse flange frames are located at the ends of each section so that abutting sections may be bolted together at their corners with the flange frames held by clips or drive cleats. These frames are typically not integral to the duct section.

These types of flanges are well known and widely utilized. One type of such flanges are known as "slip-on" flanges. Slip-on flanges are roll formed and cut to a proper length. Then, four flange pieces and four corner pieces are assembled into a frame, which is attached to each end of a duct section. The duct sections can then be connected by joining the frames with mechanical fasteners. If one of the sides of the duct section is relatively long, then reinforcing bars may have to be added within the flanges to provide the necessary support strength. The addition of an extra part to the connecting system obviously increases the installation time for assembling the duct sections together.

With the forgoing problems and concerns in mind, it is the general object of the present invention to provide a flange, which overcomes the above-described drawbacks while maximizing flange strength.

SUMMARY OF THE INVENTION

It is an object of the present invention to provide a double wall TDX flange.

It is another object of the present invention to provide a double wall TDX flange that may reduce the assembly time of ductwork.

It is another object of the present invention to provide a double wall TDX flange that is stronger than known flanges.

It is another object of the present invention to provide a double wall TDX flange that is aesthetically similar to known slip-on flanges.

It is yet another object of the present invention to provide an IPI box flange.

It is yet another object of the present invention to provide an IPI box flange that is stronger than known box flanges.

It is yet another object of the present invention to provide an IPI box flange that may reduce the assembly time of ductwork.

It is yet another object of the present invention to provide an IPI box flange that is aesthetically similar to known slip-on flanges.

These and other objectives of the present invention, and their preferred embodiments, shall become clear by consideration of the specification, claims and drawings taken as a whole.

DETAILED DESCRIPTION OF THE PREFERRED EMBODIMENT

Figure 1:
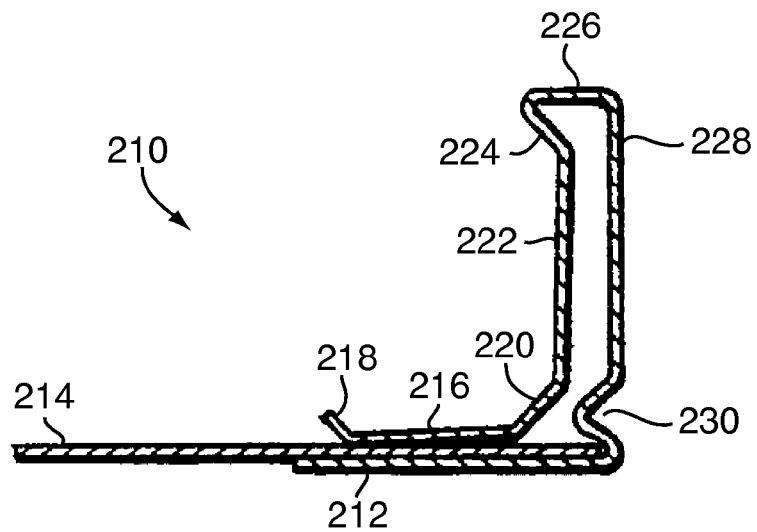
FIG. 1 is a cross-sectional view of a known slip-on flange.

FIG. 1 illustrates a cross-sectional view of a known slip-on flange 210. As shown in FIG. 1, the flange 210 receives a duct wall 214. The duct wall 214 is engaged between an inner portion 212 and an outer portion 216 of the flange 210. A free edge 218 of the outer portion 216 is bent outwardly to facilitate the engagement. At the opposite end of the free edge 218, a first flange portion 220 is bent at about a 45° angle from the outer portion 216. A second flange portion 222 is then bent so as to be substantially perpendicular to the outer portion 216. Then, a third flange portion 224 is bent at about a 45° angle toward the free edge 218. Next, a fourth flange portion 226 is bent back to be substantially parallel to the outer portion 216. A fifth flange portion 228 is bent at a right angle to be substantially parallel to the second flange portion 222. Finally, a sixth flange portion 230 is bent in an S-shape around the duct wall 214 and ends with the inner portion 212.

It will be readily appreciated that the slip-on flange 210 represents a widely known flange in connecting duct sections. However, its design creates relatively large cavities between the flange portions, which are capable of bending or deformation. This deformation can then lead to leaks in the duct system. Furthermore, each flange portion of the flange 210 is bent at a hard angle, which creates additional weaknesses in the flange 210.

Figure 2:
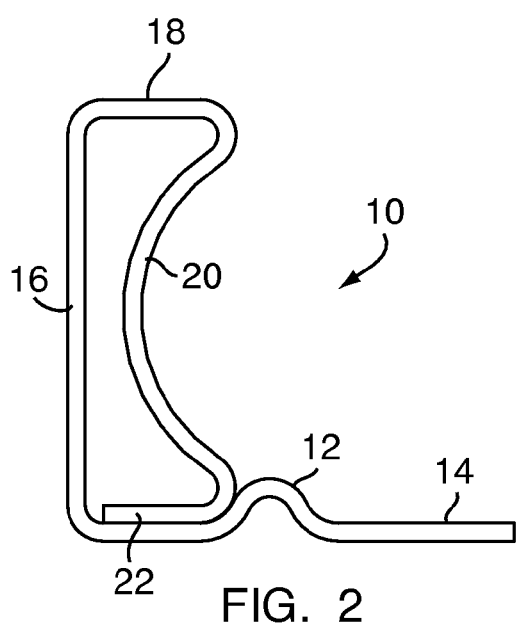
FIG. 2 is a cross-sectional view of an IPI box flange, according to an embodiment of the present invention.

In contrast, FIG. 2 illustrates a cross-sectional view of an IPI box flange 10 according to one embodiment of the present invention. As shown in FIG. 2, the flange 10 includes a bead 12, which is formed outward from a duct surface 14. A first flange portion 16 is formed perpendicularly outward from the duct surface 14. A second flange portion 18 is bent back substantially parallel to the duct surface 14. Then, a third flange portion 20 is bent in an arcuate fashion inwardly toward the first flange portion 16 and ending substantially next to the duct surface 14 and prior to the bead 12. Finally, a fourth flange portion 22 is bent back toward the first flange portion 16, substantially parallel to the second flange portion 18, and substantially parallel to and along the duct surface 14.

It will be readily appreciated that the configuration of the upper portion flange 10 is substantially similar to the configuration of flange 210. These similarities make the flange 10 aesthetically similar to known flanges, such as the known slip-on flange 210.

It is an important aspect of the present invention that the third flange portion 20 is bent in an arcuate fashion. As discussed above, known flanges, such as the known slip-on flange 210, have flange portions that are bent at hard angles, which produce weaknesses in the flange. In contrast, the third flange portion 20 of the IPI box flange 10 is curved so as to avoid a hard angle. This configuration creates a stronger flange than known configurations. Since flange 10 is stronger, the present invention also reduces the assembly time of ductwork since there is less of a need to install reinforcing bars for support.

Figure 3:
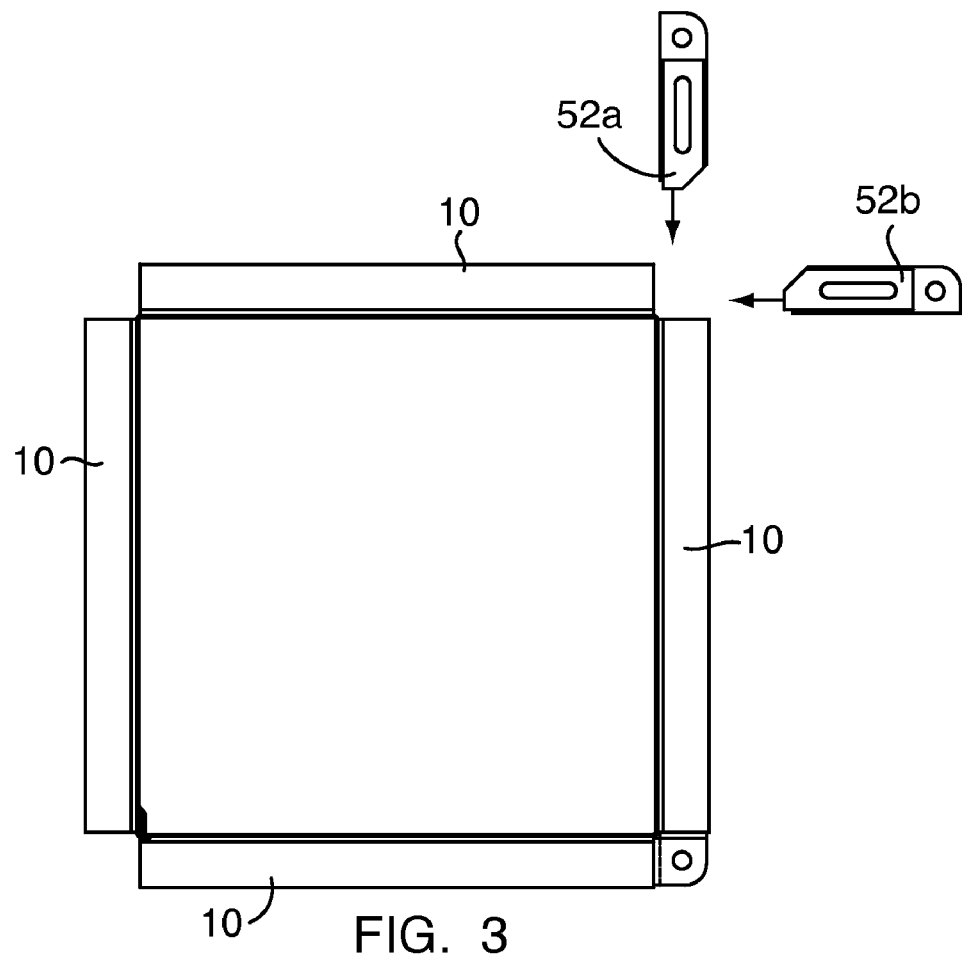
FIG. 3 is a plan view of the flange of FIG. 2 with a two-piece corner section.

FIG. 3 illustrates a plan view of the IPI box flange 10 with a corner section consisting of two pieces, 52a and 52b. As shown, in order to join the flanges 10 together, a corner section is necessary. Due to the shape of the IPI box flange 10, two separate corner pieces are required. In other words, the corner pieces 52a and 52b must be separate in order to fit within the interior cavity of the flange 10. Once both corner pieces 52a and 52b are properly inserted within the interior cavity of the flange 10, they can be fastened together as known to one of ordinary skill in the art.

Figure 4:
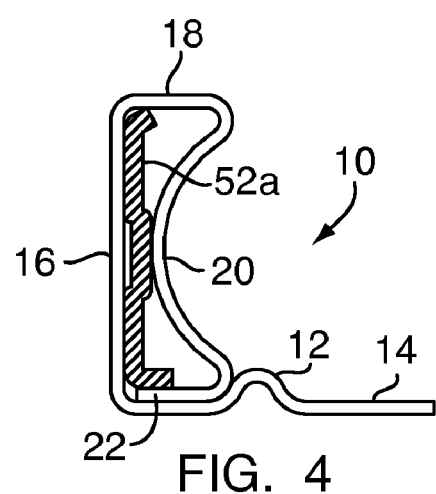
FIG. 4 is a cross-sectional view of the flange of FIG. 2 with the corner section of FIG. 3.

FIG. 4 illustrates a cross-sectional view of the IPI box flange 10 with the corner piece 52a inserted. As discussed above, since the corner piece 52a is inserted into the interior of flange 10, a two-piece corner section is required.

Although the IPI box flange 10 does provide superior strength over known flanges, it will be readily appreciated that a corner consisting of two pieces that must be slid into the interior of the flange 10 requires extra assembly time that would be avoided by a one-piece corner.

Figure 5:
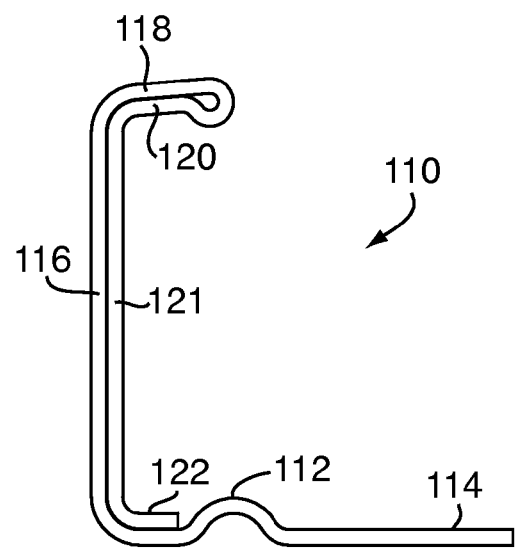
FIG. 5 is a cross-sectional view of a double wall TDX flange, according to an embodiment of the present invention.

FIG. 5 illustrates a cross-sectional view of a double wall TDX flange 110 according to one embodiment of the present invention, which requires only a one-piece corner as will be described in further detail later. The flange 110 has a double wall situated on both ends of the flange 110 for superior flange strength without deformation.

As depicted in FIG. 5, the flange 110 includes a bead 112, which is formed outward from a duct surface 114. A first flange portion 116 is formed perpendicularly outward from the duct surface 114. A second flange portion 118 is bent back substantially parallel to the duct surface 114.

At this point, it will be readily appreciated that the configuration of flange 110 is substantially similar to the configuration of flange 210. These similarities make the flange 110 aesthetically similar to known flanges, such as the known slip-on flange 210.

Returning to FIG. 5, a third flange portion 120 is bent back along the second flange portion 118 and towards the first flange portion 116 so as to be in substantial touching relationship with the second flange portion 118. A fourth flange portion 121 is bent at a right angle to be formed along the first flange portion 116, so as to be in substantial contact thereto. Finally, a fifth flange portion 122 is bent at a right angle toward the bead 112, substantially parallel to the second flange portion 118 and the third flange portion 120, and substantially parallel to and in substantial contact with the duct surface 114.

It is an important aspect of the present invention that the flange 110 has a double wall along both ends of the flange 110 in order to provide superior flange strength. That is, the double-walled construction created by second flange portion 118 and third flange portion 120 as well as fifth flange portion 122 and duct surface 114 provides a stronger flange than known configurations. Moreover, in contrast with the commonly known flange 210 illustrated in FIG. 1, the flange 110 is also less susceptible to deformation. Furthermore, the present invention also reduces the assembly time of ductwork since there is less of a need to install reinforcing bars for support.

Figure 6:
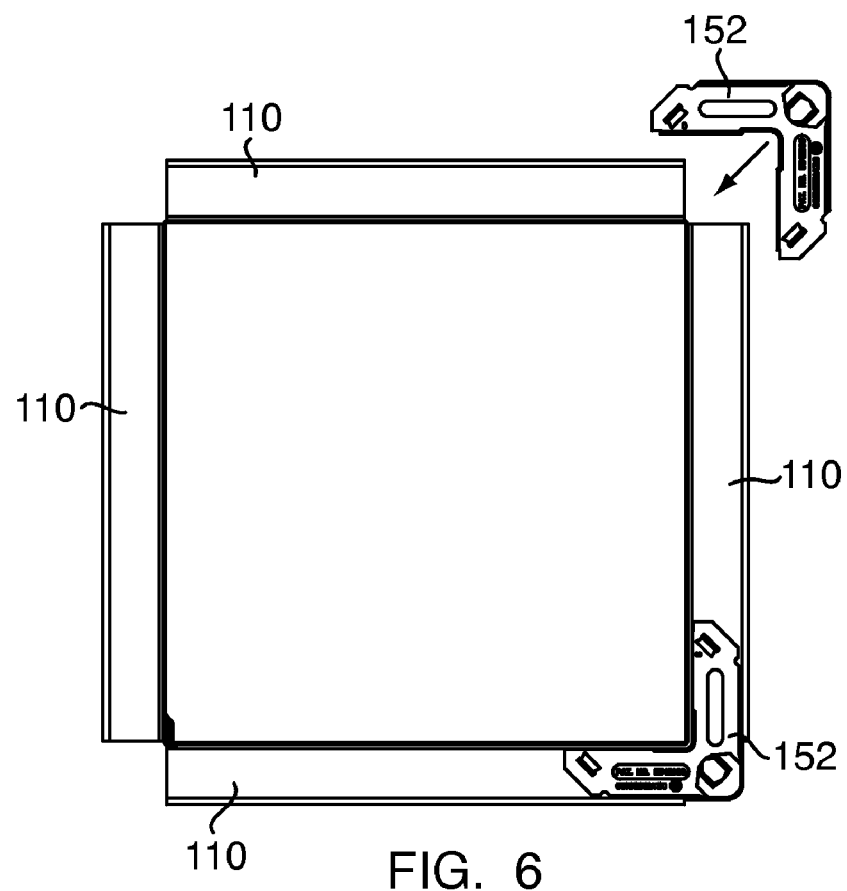
FIG. 6 is a plan view of the flange of FIG. 5 with a one-piece corner section.

FIG. 6 illustrates a plan view of the TDX flange 110 with a corner section 152 consisting of only a single piece. As shown, in order to join the flanges 110 together, a corner section is necessary. In contrast to the IPI box flange 10 and other known box flanges, only one corner piece 152 is required. The corner piece 152 is simply slipped on the outside of the flange 110. This configuration lessens the number of pieces when assembling duct work and lessens the time needed for assembly.

Figure 7:
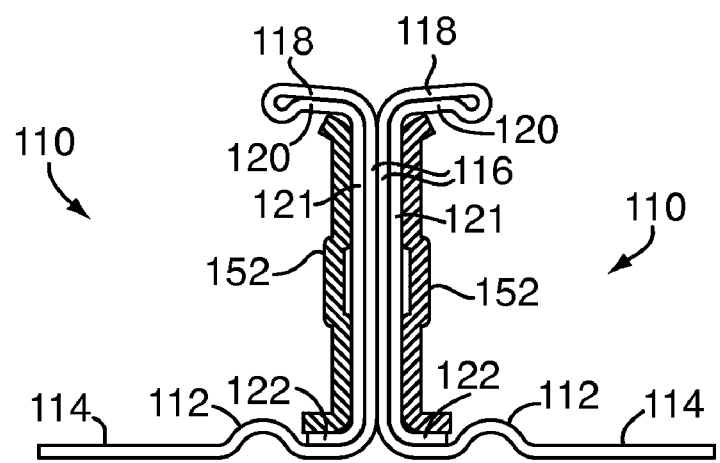
FIG. 7 is a cross-sectional view of the flange of FIG. 5 with the corner section of FIG. 6.

FIG. 7 illustrates a cross-sectional view of the TDX flange 110 with the corner piece 152 engaged on the outside. As opposed to the IPI box flange 10 as well as known box flanges, the TDX flange 110 accommodates a corner section of a single piece.

As will be appreciated by consideration of the embodiments illustrated in FIGS. 2-5, the present invention provides a flange having a heretofore unknown strength. Moreover, the flange of the present invention is also less susceptible to deformation. Another inherent benefit of the present invention resides in the ability of the flange to closely and substantially resemble the configuration of known slip-on flanges, an industry standard.

While the invention has been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all equivalent embodiments.

What is claimed is:

1. A flange for ductwork, wherein the flange is integrally formed at a distal end of a duct surface, said flange comprising:
    a first flange portion formed perpendicularly outward from said duct surface;
    a second flange portion bent at a right angle from said first flange portion and substantially parallel to said duct surface;
    a third flange portion bent in an arcuate fashion inwardly toward said first flange portion and ending substantially near said duct surface;
    a fourth flange portion bent back toward said first flange portion to be in substantial touching relationship with said duct surface, and
    a bead formed outwardly from said duct surface, wherein said third flange portion ends adjacent to said bead.

2. A method for forming a flange for ductwork, said method comprising the steps of:
    integrally forming said flange at a distal end of a duct surface;
    wherein integrally forming said flange includes bending a first flange portion perpendicularly outward from said duct surface, bending a second flange portion at a right angle from said first flange portion to be substantially parallel to said duct surface, bending a third flange portion in an arcuate fashion inwardly toward said first flange portion and ending substantially near said duct surface, bending a fourth flange portion back toward said first flange portion to be in substantial touching relationship with said duct surface, and
    forming a bead outwardly from said duct surface, wherein said third flange portion ends adjacent to said bead.

* * * * *